United States Patent Office 2,733,233
Patented Jan. 31, 1956

2,733,233

VINYL ESTERS OF N-CARBACYL-ALPHA-MONO-AMINOMONOCARBOXYLIC ACIDS, THEIR PREPARATION AND POLYMERS THEREOF

Ralph E. Miegel, Wilmington, Del., Carl G. Niemann, Pasadena, Calif., and John C. Sauer, Wilmington, Del., assignors to E. I. du Pont de Nemours and Company, Wilmington, Del., a corporation of Delaware No Drawing. Application October 18, 1954,
Serial No. 463,044

28 Claims. (Cl. 260—89.1)

This invention relates to a new class of vinyl compounds, to their preparation and to polymers obtained therefrom. More particularly this invention relates to novel vinyl esters of amino acids, to methods for their preparation, and to polymers of these new vinyl esters of amino acids.

Vinyl esters of organic acids, particularly the carboxylic acids, are most conveniently and usually prepared by the vapor phase reaction between acetylene and the necessary acid, either alone or more frequently in the presence of fixed beds of selected metal salt or oxide catalysts. In the case of the alpha-aminocarboxylic acids, such a procedure is extremely difficult in view of the very low vapor pressure of the amino acids, even at elevated temperatures. Liquid phase vinylation of various active hydrogen-containing compounds is also well known and is practiced when for various reasons the generally cheaper vapor phase process is not applicable. In the case of the alpha-aminocarboxylic acids, however, even at the relatively low temperatures required for the liquid phase process, appreciable quantities of the cyclic dimers, i. e., the diketopiperazines, are formed and substantially no vinylation occurs.

It is an object of this invention to provide a new class of vinyl compounds. A further object of this invention is to provide a new class of vinyl esters of amino acids and methods for their preparation. An important object is to provide novel polymers of these new vinyl esters. Other objects will appear hereinafter.

These objects are accomplished by the present invention which provides a new class of vinyl esters of carboxylic acids wherein the carbon alpha to the acyl portion of the ester function carries an acylamido group. It has now been found that the use of the simple N-acyl-alpha-amino acids, i. e., the alpha-acylamidocarboxylic acids, results in a simple clean-cut reaction with acetylene in the liquid phase to form the vinyl esters of the N-acylamino acids. There has now been discovered this new class of vinyl esters of N-carbacyl-alpha-aminocarboxylic acids represented by the structural formula

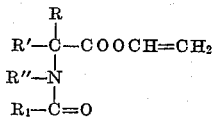

wherein R, R', R'' and R₁ represent hydrogen or organic radicals free of aliphatic unsaturation, preferably free of Zerewitinoff active hydrogen, and most preferably hydrocarbon radicals free of aliphatic unsaturation and usually of not more than 8 carbons each. Generally, the total number of carbons in the R, R', R'' and R₁ groups will not exceed 20 carbon atoms. Any two of the R, R' and R'' groups can also be joined together to form a carbocyclic or heterocyclic ring. These vinyl esters of N-carbacyl-alpha-aminocarboxylic acids can be polymerized by the usual methods for polymerization of vinyl compounds.

Conveniently these new vinyl N-acyl-alpha-aminocarboxylates are prepared by pressuring acetylene under moderate pressures, e. g., 25–300, and preferably 100–300 lb./sq. in. gauge, and under essentially anhydrous conditions into a pressure-resistant reaction vessel containing the intermediate N-acyl-alpha-aminocarboxylic acid, and usually an inert solvent, such as dioxane. The reaction mixture is then preferably heated to 40–150° C. and the acetylene pressure maintained by introducing additional acetylene as needed. After absorption of acetylene ceases, the reaction mixture is cooled, any excess acetylene bled off, and the contents of the reaction vessel removed and subjected to distillation.

In this way the vinyl N-acyl-alpha-aminocarboxylates are obtained, usually as light colored liquids boiling at temperatures in the range 100–200° C. under reduced pressures. As the number of carbon atoms in the molecular structure increases, the boiling point of the products correspondingly increases and, generally speaking, when the new compounds contain more than about 15 or 16 carbons the products will be solid at room temperature.

The preparation and polymerization of typical vinyl N-acyl-alpha-aminocarboxylates are illustrated in the following examples in which parts are given by weight unless otherwise stated.

EXAMPLE I

*Part A.—Preparation of the vinyl ester of N-acetylalanine*

A pressure-resistant, metal reaction vessel was purged with oxygen-free nitrogen and charged with 40 parts of N-acetyl-DL-alanine (i. e., N-acetyl-DL-alpha-aminopropionic acid), six parts of yellow mercuric oxide, three parts of 100% sulfuric acid, and about 125 parts of purified dioxane. The reaction vessel was then closed, pressure tested, cooled in a Dry-Ice/acetone bath, and finally evacuated to an internal gauge pressure corresponding to about 5 mm. of mercury. The vessel was then placed in a shaker box, fitted with means for heating and also for injecting acetylene under pressure as needed—all behind suitable protective barricades. The vessel was heated and pressured with acetylene until a temperature of 75° C. and a pressure of 190 lb./sq. in. (gauge) of acetylene was obtained. The reaction vessel was maintained under these conditions with shaking for a period of about five hours with periodic injections of acetylene as required to maintain this approximate pressure. At the end of this five-hour period, there was no apparent further absorption of acetylene.

The reactor was then cooled to room temperature, the excess acetylene vented, and the reaction mixture removed. After neutralization with aqueous sodium carbonate solution, the reaction mixture was extracted with diethyl ether. The ether was removed from the extract by distillation at atmospheric pressure and the residual crude liquid product was then distilled through a precision fractionating column. There was thus obtained 3.7 parts of the vinyl ester of N-acetylalanine, i. e., vinyl N-acetyl-alpha-aminopropionate or vinyl alpha-acetamidopropionate as a clear liquid, boiling at 102–110° C. at pressures corresponding, respectively, to 1.3 and 1.8 mm. of mercury.

Analysis:
    Calc'd for $C_7H_{11}O_3N$__ C, 53.5%; H, 7.0%; N, 8.9%
    Found _____ C, 53.5%; H, 7.2%; N, 8.5%
                         53.5%    7.4%     8.5%

*Part B.—Preparation of polyvinyl N-acetyl-alpha-aminopropionate*

Another sample of vinyl N-acetyl-alpha-aminopropionate prepared as in Part A above but without the added sulfuric acid and at temperatures ranging from 60–74° C.

under acetylene pressures of from 170–235 lb./sq. in. (gauge) was refractionated and about a 15% heart cut was taken as the pure vinyl N-acetyl-alpha-aminopropionate. A sample of this twice distilled product was heated at 80° C. for five hours in the presence of a trace of alpha,alpha'-azodiisobutyronitrile polymerization initiator under an atmosphere of nitrogen. The polyvinyl N-acetyl-alpha-aminopropionate was thus obtained as a clear, viscous oil. Similar results were obtained with another sample of the vinyl N-acetyl-alpha-aminopropionate by heating at 100° C. for six hours with 1,1'-azodicyclohexane carbonitrile polymerization initiator.

*Part C.—Preparation of a crosslinked formaldehyde/polyvinyl N-acetyl-alpha-aminopropionate copolymer*

Ten parts of the latter viscous polyvinyl N-acetyl-alpha-aminopropionate of Part B above was heated with one part of alpha-polyoxymethylene at steam bath temperatures for 24 hours. Under these conditions the alpha-polyoxymethylene decomposes to formaldehyde which reacts with the amide hydrogens of the polyvinyl N-acetyl-alpha-aminopropionate to form a solid, crosslinked, space network formaldehyde/polyvinyl N-acetyl-alpha-aminopropionate aminoplast copolymer.

EXAMPLE II

*Part A.—Preparation of N-acetyl-C-phenylglycine*

To a cooled (15° C.) slurry of 120 parts of C-phenylglycine (i.e., alpha-phenyl-alpha-aminoacetic acid) in a mixture of 200 parts of aqueous 4 N sodium hydroxide solution and 100 parts of water was added with stirring, separately and concomitantly, over a period of 45 minutes, 70 parts of acetyl chloride and 225 parts of aqueous 4 N sodium hydroxide solution. The reaction mixture was then made acid to litmus paper with concentrated hydrochloric acid and the resultant precipitate removed by filtration and dried. There was thus obtained 123 parts of N-acetyl-C-phenylglycine, i. e., alpha-acetamidophenylacetic acid, as a white, amorphous powder.

Analysis:
  Calc'd for $C_{10}H_{11}O_3N$ _____ N, 7.3%
  Found _____ N, 7.8%
                                            7.9%

*Part B.—Preparation of the vinyl ester of N-acetyl-C-phenylglycine*

A mixture of 75 parts of the above N-acetyl-C-phenylglycine, six parts of yellow mercuric oxide, and three parts of 100% sulfuric acid in about 150 parts of anhydrous dioxane was heated in a closed reactor for five hours at 60–65° C. under 125–200 lb./sq.in. (gauge) pressure of acetylene in the manner described in Example I. The reaction mixture was diluted with about 200 parts of diethyl ether and the solids removed by filtration. The filtrate was then washed with dilute potassium hydroxide and finally dried over anhydrous calcium sulfate. After removing the ether and dioxane by distillation under reduced pressure, there was thus obtained as a residue 1.8 parts of the vinyl ester of N-acetyl-C-phenylglycine (i.e., vinyl alpha-acetamidophenylacetate) as a clear, lightly colored liquid.

Analysis:
  Calc'd for $C_{12}H_{13}O_3N$ _____ N, 6.4%
  Found _____ N, 5.9%
                                            5.9%

EXAMPLE III

*Part A.—Preparation of N-acetyl-2-amino-4,6,6-trimethlyheptanoic acid*

In the manner described above in Example II, Part A, using a slurry of 98 parts of 2-amino-4,6,6-trimethylheptanoic acid in a mixture of 200 parts of water and about 132 parts of aqueous 4 N sodium hydroxide solution, about 46 parts of acetyl chloride, and a second portion of about 148 parts of aqueous 4 N sodium hydroxide solution, there was obtained 80 parts of N-acetyl-2-amino-4,6,6-trimethylheptanoic acid as a white, amorphous powder.

Analysis:
  Calc'd for $C_{12}H_{23}O_3N$ _____ N, 6.1%
  Found _____ N, 6.1%
                                            6.0%

*Part B.—Preparation of the vinyl ester of N-acetyl-2-amino-4,6,6-trimethylheptanoic acid*

A mixture of 62 parts of the above N-acetyl-2-amino-4,6,6-trimethylheptanoic acid, six parts of yellow mercuric oxide, and three parts of 100% sulfuric acid in about 150 parts of anhydrous dioxane was heated with shaking for 4.6 hours at 65–82°C. in a closed reactor under 150–220 lb./sq.in. (gauge) pressure of acetylene in the manner described in Example I. The reaction mixture was worked up as described in Example II, Part B. There was thus obtained 2.3 parts of the vinyl ester of N-acetyl-2-amino-4,6,6-trimethylheptanoic acid (i.e., vinyl 2-acetamido-4,6,6-trimethylheptanoate) as a clear, lightly colored liquid.

Analysis:
  Calc'd for $C_{14}H_{25}O_3N$ _____ N, 5.5%
  Found _____ N, 6.0%
                                            6.0%

EXAMPLE IV

*Part A.—Preparation of N-phenylacetyl-1-aminocyclohexane-carboxylic acid*

To a cooled (about 5°C.) slurry of 71.5 parts of 1-aminocyclohexanecarboxylic acid in about 225 parts of 4 N aqueous sodium hydroxide solution was added dropwise with stirring over a period of about 45 minutes, separately and concomitantly, 77.3 parts of C-phenylacetyl chloride and about 140 parts of aqueous 4 N sodium hydroxide solution, while cooling the reactor with an ice/water bath. The reaction mixture was allowed to stand for 16 hours at room temperature and the resulting clear solution was made acid to litmus with concentrated hydrochloric acid. The resulting precipitate was removed by filtration and dried. There was thus obtained 70 parts of N-phenylacetyl-1-aminocyclo-hexanecarboxylic acid as a white, amorphous powder.

Analysis:
  Calc'd for $C_{15}H_{19}O_3N$ _____ N, 5.4%
  Found _____ N, 5.6%
                                            5.8%

*Part B.—Preparation of the vinyl ester of N-phenylacetyl-1-aminocyclohexanecarboxylic acid*

A mixture of 70 parts of the above N-phenylacetyl-1-aminocyclohexanecarboxylic acid, four parts of yellow mercuric oxide and two parts of 100% sulfuric acid in about 100 parts of anhydrous dioxane was heated with shaking for 6.5 hours at 68–85° C. in a closed reactor under 170–220 lb./sq. in. (gauge) pressure of acetylene in the manner described in Example I. The reaction mixture was worked up in the manner described in Example II, Part B. There was thus obtained 2.5 parts of the vinyl ester of N - phenylacetyl - 1 - aminocyclohexanecarboxylic acid (i. e., vinyl 1 - phenylacetamidocyclohexanecarboxylate) as a white crystalline solid.

Analysis:
  Cal'd for $C_{17}H_{21}O_3N$ _____N, 5.1%
  Found _____N, 5.1%
                                            5.2%

It will be understood that the above examples are merely illustrative and that the present invention is generic to the vinyl esters of N - acyl - alpha - aminocarboxylic acids and to their preparation from acetylene and the requisite acid. The vinyl N - carbacyl - alpha - aminocarboxylates of this invention can be represented by the following structural formula

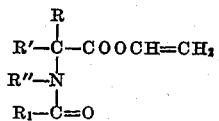

wherein the various R, R', R" and R₁ groups, which can be alike or different and any two of which R, R' and R" groups can be together joined pairwise, are hydrogen or organic radicals free of aliphatic unsaturation and usually of no more than 18 carbons apiece with the total number of carbons in the said R, R', R" and R₁ groups generally being no more than 20. Thus the radicals can be aliphatic, aromatic, cycloaliphatic, araliphatic, alkaromatic, or heterocyclic. Suitable examples of compounds falling within the broad scope of this invention include vinyl N - acetyl - alpha - amino - alpha - methylstearate; the vinyl ester of N - propionylmethionine, i. e., vinyl gamma-methylmercapto - alpha - propionamido - n - butyrate; the vinyl ester of N - acetylhistidine, i. e., vinyl alpha - acetamido - beta - imidazolpropionate and the like.

Because of their readier availability and greater ease in preparation, the preferred compounds are the vinyl esters of N - acyl - alpha - monoaminomonocarboxylic acids which, other than the vinyloxycarbonyl group and the alpha-carbacylamido substituent, are wholly hydrocarbon and free of aliphatic unsaturation. These compounds are described by the above formula wherein the R, R', R" and R₁ groups, which can be alike or different, are hydrogen or hydrocarbon radicals free of aliphatic unsaturation and usually of no more than 8 carbons apiece, any two of which R, R' and R" groups may be together joined. Thus, the R, R', R" and R₁ groups can be hydrogen; alkyl, such as methyl through octyl; cycloalkyl, such as cyclohexyl; aryl, such as phenyl; alkaryl, such as tolyl; and aralkyl, such as benzyl. Any one pair of R, R' and R', R" or R, R" can be divalent saturated aliphatic hydrocarbon radicals joined together to form a ring. Thus, the divalent saturated aliphatic hydrocarbon radicals R and R' joined together form with the carbon atom to which they are attached a carbocylic ring, preferably a 5 to 7-membered carbocyclic ring. The divalent saturated aliphatic hydrocarbon radicals R' and R" or R and R" joined together form with the respective carbon and nitrogen atoms to which they are attached a heterocyclic ring, preferably a 5 to 7-membered heterocyclic ring and more specifically an azacyclic radical.

Suitable specific examples of such compounds include the vinyl ester of N - acetylproline, i. e., vinyl N - acetylpyrrolidine - alpha - carboxylate; vinyl 1 - propionamido-cyclohexanecarboxylate, vinyl alpha,alpha - diethyl-alpha - (N - methylbutyramido)acetate, and the like.

Because of their still greater ease of preparation and still readier availability as well as their superior polymerizability, an especially preferred class is the vinyl esters of N - carbacyl - alpha - monoaminomonocarboxylic acids, wherein both the alpha carbon and aminonitrogen are hydrogen-bearing and which, other than the said vinyloxycarbonyl group and the alpha-carbacylamido substituent, are solely hydrocarbon and free of aliphatic unsaturation. These especially preferred compounds of the present invention can be described by the following structural formula

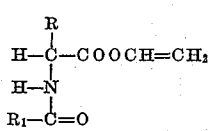

wherein R and R₁ are hydrogen or monovalent aliphatic hydrocarbon radicals free of aliphatic unsaturation and of no more than 8 carbons apiece. Suitable specific examples of these compounds include the vinyl ester of N-formylglycine, i. e., vinyl formamidoacetate, wherein it is to be noted both R and R₁ are hydrogen, the vinyl esters of N-carbacylvaline, leucine, isoleucine, norleucine, beta - phenylalanine, proline, 2 - amino - 4,6,6 - trimethyl-heptanoic acid, and the like wherein the respective acyl groups are acetyl, propionyl, butyryl, isobutyryl, alpha,-alpha-dimethylpropionyl, i. e. pivaloyl, benzoyl, phenylacetyl, and the like.

These new vinyl esters can conveniently be prepared by the direct reaction between acetylene and the requisite N - acyl - alpha - aminocarboxylic acid under a wide range of conditions, except that superatmospheric pressure will generally be used since acetylene is a gas under normal conditions. It is desirable to pressure the reaction mixture with acetylene throughout the reaction which means that acetylene will be present in excess over the stoichiometric quantities required, particularly during the latter part of the reaction. It is to be noted that necessary precautions well known in the art must be taken when operating under pressure in view of the hazards attendant upon the use of acetylene under such conditions. While the reaction is generally carried out under superatmospheric pressure, the magnitude of the pressure is not critical. Pressures in the range 25–300 and preferably 100–300 lb./sq. in. (gauge) are suitable, but the actual operating pressures may vary from this range widely.

In the reaction with acetylene no added catalyst is necessary; however, improved results are obtained by carrying out the vinylation in the pressence of small amounts, e. g., from 0.5 to 5.0 mole percent, based on the N-acyl-alpha-amino acid of heavy metal, especially mercury, oxides or their salts, such as mercuric oxide, mercuric sulfate, mercuric phosphate, mercuric phosphite, and the like.

The best results are obtained for the most part under substantially anhydrous conditions, using an inert reaction medium. Although they are not limiting requirements, such conditions are preferred because of greater reaction efficiency. Typical inert organic solvents which can be used include the normally liquid open chain or cyclic ethers, such as dixoane and tetrahydrofuran, and amides, such as dimethylformamide.

The optimum temperature for the vinylation reaction is within the range 40–150° C., and under substantially anhydrous conditions, the reaction proceeds in this temperature range most effectively in reaction times of from two to about twenty-four hours. Generally speaking, the reaction is substantially complete under these conditions within about three to four hours. As shown in the examples, temperatures of 60–100° C. are particularly effective in accomplishing the reaction during two to six hours. Variations within these ranges of time and temperature will be apparent to those skilled in the art.

The various requisite N-acyl-alpha-aminocarboxylic acid intermediates are generically known compounds and their preparation is by known prior art methods. For example, suitable intermediates can be prepared by the direct condensation of a carboxylic acid halide and the free alpha-amino hydrogen-bearing, alpha-aminocarboxylic acid. Usually the carboxylic acid chlorides are used because of their greater availability and for convenience the reaction is generally carried out in solution in an inert organic medium, and preferably under basic conditions. These N-acyl-alpha-aminocarboxylic acids can be represented by the general formulas given herein with hydrogen in place of the vinyl group and the specific starting materials are the acids corresponding to the specific vinyl esters disclosed herein.

The vinyl esters of the N-acyl-alpha-amino acids can be polymerized by known methods for the polmerization of vinyl compounds in general. Suitable polymerization initiators include the organic peroxides, persulfates, and the azonitrile initiators described in U. S. patent to Hunt 2,471,959. In general, any compound capable of yielding unstable, free radicals under the conditions of polymerization can be used as a polymerization initiator.

The vinyl esters of the N-acyl-alpha-aminocarboxylic acids can be polymerized alone or in admixture with other polymerizable compounds, particularly polymerizable ethylenically unsaturated monomers. Examples of such compounds include the olefins, e. g., ethylene and styrene, dienes such as butadiene and chloroprene, vinyl esters, e. g., vinyl fluoride, vinyl chloride, vinyl acetate, halogenated ethylenes, e. g., vinylidene chloride, chlorotrifluoroethylene, and tetrafluoroethylene, acrylic and alpha-substituted acrylic compounds, e. g., ethyl acrylate, methyl methacrylate, acrylonitrile, and the like; maleic and fumaric compounds, e. g., maleic anhydride, and ethyl fumarate, and the like. The vinyl esters of the N-acyl-alpha-aminocarboxylic acids can be polymerized with each other or with one or more of the above types of monomers. The various polymers and co-polymers can be prepared using conventional bulk, solution, or aqueous dispersion-type systems at temperatures ranging conventionally from 40 to about 150° C.

The new polymers of this invention are useful in the preparation of coating and adhesive compositions. Thus, the polymers and copolymers with other polmerizable ethylenically unsaturated monomers are useful in organic solution in the preparation of protective coatings for metals, wood, and the like, either as clear or suitably colored compositions using conventional pigments and dyes. The polymers and copolymers, particularly those with the polymerizable diene monomers such as butadiene, isoprene, and chloroprene, are useful in organic solution as adhesives for adhering protective films to substrates, e. g., cellophane to the surfaces of synthetic polymer sheeting; for adhering plies one to the other in the preparation of laminates, e. g., in the preparation of plywood, and the like. As illustrated in the examples, the polymers are useful as intermediates with formaldehyde or precursors thereto in the formation of crosslinked, insoluble, space network, aminoplast resins which are useful as textile-treating agents and in the preparation of molded objects such as toothbrush handles, electrical fixtures, combs, and the like. In these and other uses, as in the preparation of protective coatings, the polymers can be compounded with dyes, pigments, fillers, plasticizers, antioxidants and other polymers. The polymers are also useful as a source of amino acids under controlled conditions. Thus, the polyvinyl alpha-acyl-amidocarboxylates serve as controlled plant and animal nutrients in supplying the respective alpha-amino acid in free and utilizable form, at a rate dependent upon the relative intensity of the hydrolytic conditions present in the system involved.

Aside from their use in making polymers, the vinyl esters of the N-acyl-alpha-amino acids are useful per se, like the polymers, in affording a controllable source of available free amino acid in high purity. The vinyl esters are also useful as plant growth regulants. The vinyl esters are particularly outstanding in their utility as acylating agents, particularly in their application to the synthesis of peptides, proteins, and analogs thereof. Thus, the vinyl esters can be used to advantage to extend the alpha-amino acid chain of a peptide of low molecular weight or a protein analog by one amino acid unit in each reaction step, and at the same time not contaminate the system with unwanted products such as hydrohalic acids. In such reactions the conventional reactant used has been the alpha-aminocarboxylic acid halides, particularly the chlorides. However, in each such acylation the hydrohalic acid corresponding to the acid halide used is normally liberated in the system on an equimolar basis for every new acyl-amido link formed. This by-product is obviously undesirable and in many instances particularly so since it results in insolubilization of the material being modified.

As many apparently widely different embodiments of this invention may be made without departing from the spirit and scope thereof, it is to be understood that this invention is not limited to the specific embodiments thereof except as defined in the appended claims.

We claim:

1. A vinyl N-carbacyl-alpha-aminocarboxylate represented by the formula

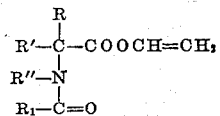

wherein R, R' and R'' are selected from the class consisting of hydrogen, hydrocarbon radicals free of aliphatic unsaturation, and divalent saturated aliphatic hydrocarbon radicals for any two of the groups R, R' and R'' which are joined together to form a ring, and $R_1$ is selected from the class consisting of hydrogen and hydrocarbon radicals free of aliphatic unsaturation.

2. A polymer of a vinyl N-carbacyl-alpha-amino carboxylate as set forth in claim 1.

3. A vinyl N-carbacyl-alpha-aminocarboxylate represented by the formula

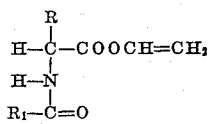

wherein R is a hydrocarbon radical free of aliphatic unsaturation and $R_1$ is a hydrocarbon radical free of aliphatic unsaturation, the total number of carbon atoms in R and $R_1$ not exceeding twenty.

4. A polymer of a vinyl N-carbacyl-alpha-aminocarboxylate as set forth in claim 3.

5. A vinyl N-carbacyl-alpha-aminocarboxylate represented by the formula

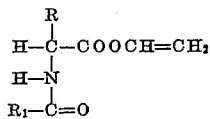

wherein R is an alkyl radical of no more than 8 carbon atoms and $R_1$ is an alkyl radical of no more than 8 carbon atoms.

6. A polymer of a vinyl N-carbacyl-alpha-aminocarboxylate as set forth in claim 5.

7. Vinyl N-acetyl-alpha-aminopropionate.

8. A polymer of vinyl N-acetyl-alpha-aminopropionate.

9. A vinyl N-carbacyl-alpha-aminocarboxylate represented by the formula

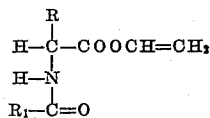

wherein R is an aryl radical and $R_1$ is an alkyl radical, the total number of carbon atoms in R and $R_1$ not exceeding twenty.

10. A polymer of a vinyl N-carbacyl-alpha-aminocarboxylate as set forth in claim 9.

11. The vinyl ester of N-acetyl-C-phenylglycine.

12. A polymer of the vinyl ester of N-acetyl-C-phenylglycine.

13. A vinyl N-carbacyl-alpha-aminocarboxylate represented by the formula

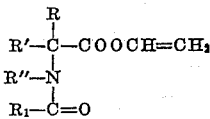

wherein R and R' are divalent saturated aliphatic hydrocarbon radicals joined together to form with the carbon atom to which they are attached a 5 to 7-membered carbocyclic ring, R'' is hydrogen and $R_1$ is an aralkyl radical of not more than 8 carbon atoms.

14. A polymer of a vinyl N-carbacyl-alpha-aminocarboxylate as set forth in claim 13.

15. The vinyl ester of N-phenylacetyl-1-aminocyclohexanecarboxylic acid.

16. A polymer of the vinyl ester of N-phenylacetyl-1-aminocyclohexanecarboxylic acid.

17. The vinyl ester of N-acetyl-2-amino-4,6,6-trimethylheptanoic acid.

18. A polymer of the vinyl ester of N-acetyl-2-amino-4,6,6-trimethylheptanoic acid.

19. A viny ester of an N-carbacyl-alpha-mono aminomonocarboxylic acid, said acid being free of aliphatic unsaturation and said N-carbacyl radical being that of a monobasic monocarboxylic acid free of aliphatic unsaturation.

20. A polymer of a vinyl ester of an N-carbacyl-alpha-monoaminomonocarboxylic acid as set forth in claim 19.

21. Process which comprises reacting, at a temperature of 40 to 150° C. under a pressure of 25 to 300 lbs./sq. in., acetylene with an N-carbacyl-alpha-mono-aminomonocarboxylic acid which is free of aliphatic unsaturation, said N-carbacyl radical being that of a monobasic monocarboxylic acid which is free of aliphatic unsaturation, and separating as the resulting product the vinyl ester of said N-carbacyl-alpha-monoaminomonocarboxylic acid.

22. Process which comprises reacting, at a temperature of 40 to 150° C. under a pressure of 25 to 300 lbs./sq. in., acetylene with an N-carbacyl-alpha-mono-aminomonocarboxylic acid which other than the carboxyl and carbamoyl groups is entirely hydrocarbon free of aliphatic unsaturation, said N-carbacyl radical being that of a monobasic monocarboxylic acid which other than the carbonyl group is entirely hydrocarbon free of aliphatic unsaturation, and separating as the resulting product the vinyl ester of said N-carbacyl-alpha-monoaminomonocarboxylic acid.

23. Process as set forth in claim 22 wherein acetylene is reacted with said N-carbacyl-alpha-monoamino-monocarboxylic acid at a temperature within the range of 60 to 100° C. and under a pressure within the range of 100 to 300 lbs./sq. in.

24. Process as set forth in claim 22 wherein acetylene is reacted with said N-carbacyl-alpha-monamino-monocarboxylic acid in an inert anhydrous reaction medium and in contact with a catalyst selected from the class consisting of mercuric oxide and mercuric salts.

25. Process as set forth in claim 22 wherein said N-carbacyl-alpha-monoaminomonocarboxylic acid is N-acetyl-alpha-aminopropionic acid and said resulting product is vinyl N-acetyl-alpha-aminopropionate.

26. Process as set forth in claim 22 wherein said N-carbacyl-alpha-monoaminomonocarboxylic acid is N-acetyl-C-phenylglycine and said resulting product is the vinyl ester of N-acetyl-C-phenylglycine.

27. Process as set forth in claim 22 wherein said N-carbacyl-alpha-monoaminomonocarboxylic acid is N-phenylacetyl-1-aminocyclohexanecarboxylic acid and said resulting product is the vinyl ester of N-phenylacetyl-1-aminocyclohexanecarboxylic acid.

28. Process as set forth in claim 22 wherein said N-carbacyl-alpha-monoaminomonocarboxylic acid is N-acetyl-2-amino-4,6,6-trimethylheptanoic acid and said resulting product is the vinyl ester of N-acetyl-2-amino-4,6,6-trimethylheptanoic acid.

References Cited in the file of this patent

UNITED STATES PATENTS

| | | |
|---|---|---|
| 2,409,126 | Kenyon | Oct. 8, 1946 |
| 2,687,403 | Ballard | Aug. 24, 1954 |